United States Patent [19]

Okahashi et al.

[11] Patent Number: 4,613,167
[45] Date of Patent: Sep. 23, 1986

[54] INSULATING PIPE JOINT

[75] Inventors: Kazuo Okahashi; Osamu Hayashi; Isao Ishii; Toshiyuki Kobayashi, all of Hyogo, Japan

[73] Assignee: Mitsubishi Denki Kabushiki Kaisha, Tokyo, Japan

[21] Appl. No.: 814,022

[22] Filed: Dec. 23, 1985

Related U.S. Application Data

[63] Continuation of Ser. No. 391,767, Jun. 24, 1982, abandoned.

[30] Foreign Application Priority Data

Jun. 30, 1981 [JP] Japan ................................. 56-102805

[51] Int. Cl.$^4$ ............................................. F16L 59/14
[52] U.S. Cl. ...................................... 285/54; 285/284; 285/911; 174/85
[58] Field of Search ............ 285/54, 53, 284, DIG. 12; 174/85, 152 R

[56] References Cited

U.S. PATENT DOCUMENTS

| | | | |
|---|---|---|---|
| 1,767,612 | 6/1930 | Pieper | 285/54 |
| 1,786,719 | 12/1930 | Dippman et al. | 285/54 X |
| 3,539,430 | 11/1970 | Duryee | 174/152 R |
| 4,411,457 | 10/1983 | Inoue et al. | 285/54 X |
| 4,445,715 | 5/1984 | Inoue et al. | 285/54 |

FOREIGN PATENT DOCUMENTS 2225050 12/1973 Fed. Rep. of Germany ........ 285/54

Primary Examiner—Thomas F. Callaghan
Attorney, Agent, or Firm—Sughrue, Mion, Zinn, Macpeak, and Seas

[57] ABSTRACT

An insulating pipe joint is disclosed. The joint comprises a first tubular member, a second tubular member comprising a cylinder having the same inside diameter as that of the first tubular member and an annular metal stopper at one end of said cylinder, and an insulator made of a glass/mica composition and a cured organic, solventless resin. The annular metal stopper has an inside diameter larger than the outside diameter of the first tubular member, and the annular metal stopper nests the first tubular member with a space left between them. The insulator fills the space to hold the first and second tubular members in position and provide air- and water-tightness, and secures the insulation creeping distance between each tubular member.

3 Claims, 1 Drawing Figure

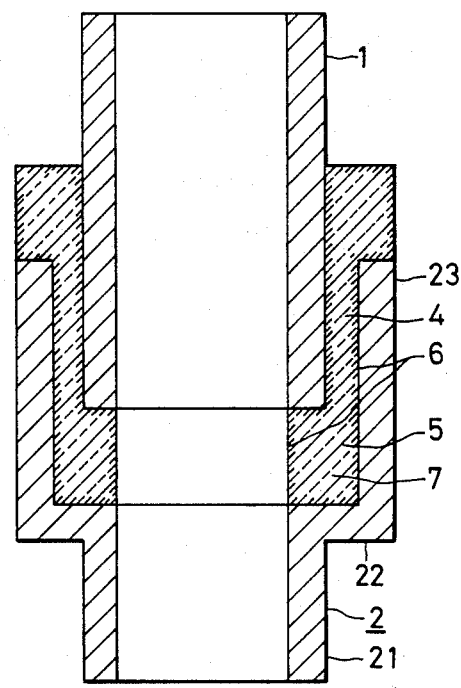

INSULATING PIPE JOINT

This is a continuation of application Ser. No. 391,767, filed 6/24/82, now aband.

FIELD OF THE INVENTION

The present invention relates to a hollow insulating pipe joint that penetrates through a metallic airtight vessel or connects metal pipes to provide electrical insulation and water- or air-tightness.

BACKGROUND OF THE INVENTION

An insulating pipe joint is widely used as a component indispensable to transportation of gases and liquids such as a coolant Freon gas. Most of the conventional insulating pipe joints are small structural elements, and large insulating pipe joints having satisfactory airtightness and watertightness are not commercially available. The present invention generally concerns an insulating pipe joint having improved water- or air-tightness.

With the recent increase in the oil price, active efforts are being made to recover oil from sand oil reserved in Canada and Venezuela. The oil sand deposits are found about 500 m below the ground and form a layer about 50 m thick. The oil in the oil sand is very viscous and cannot be recovered at ordinary temperatures by conventional pumping. Instead, steam is injected into the oil sand formation and the temperature of the oil is increased to reduce its viscosity to a level that can be lifted by a pump. But to achieve more efficient and economical recovery, intensive studies are being made on the method of using two steel oil recovery pipes each having an electrode on the end stuck in the oil sand deposit; in this method, the two pipes are positioned about 30 to 100 m apart, and a voltage of about several hundred to thousand volts is applied between the electrodes and the Joule's heat produced increases the temperature of the oil sand deposit to thereby reduce the oil viscosity. Since the oil sand deposit has a specific electrical resistance several times as high as that of the overlying stratum, an insulating pipe joint must be provided between the steel pipe in the stratum and each of the electrodes buried in the oil sand layer. Without an insulating pipe joint, an electric current flows through the stratum above the sand oil layer, not between the electrodes. This is the primary reason for the recent rapid increase in the demand for the insulating pipe joint.

The insulating pipe joint that can be used for the above purpose must meet several requirements. First of all, it must withstand a voltage as high as several hundred to thousand volts. Secondly, it must have the desired airtightness or watertightness (capable of withstanding a water pressure of about 85 kg/cm$^2$ multiplied by the safety factor) not only at ordinary temperatures but also at the temperature (about 300° C.) that can reduce the viscosity of the oil sand layer. Thirdly, the joint must have a mechanical strength sufficient to support the electrodes, or a mechanical impact strength that protects the joint from breaking upon contact with the wall of a hole made in the oil sand layer to receive each electrode.

An insulating pipe joint meeting these requirements is basically made of two electrically conducting pipes connected by an insulator that also provides air- or water-tightness. Of various factors that govern the stated requirements for the pipe joint, the most important is the insulator. The requirements are also closely related to the metallic material of which the pipe is made, as well as the construction of the joint, but these factors are largely governed by the insulator.

SUMMARY OF THE INVENTION

Therefore, one object of the present invention is to provide an insulating pipe joint that has high watertightness at about 300° C. and which also has good electrical and mechanical properties.

As a result of various efforts to develop the desired insulating pipe joint, the present inventors have found that an insulating pipe joint having high heat resistance, high air- and water-tightness, as well as good mechanical and electrical properties can be produced by first positioning first and second tubular joint members in such a manner that a space is formed around the first member, casting a glass/mica composition into the space, and impregnating the glass/mica casting in vacuum under pressure with an organic, solventless resin having high resistance to hot water and good bonding properties

BRIEF DESCRIPTION OF THE INVENTION

FIG. 1 is a side elevational section of the insulating pipe joint according to one embodiment of the present invention.

DETAILED DESCRIPTION OF THE INVENTION

The glass/mica composition used in the present invention is an insulating material prepared from a mixture of vitreous powder and mica powder by forming the mixture to a desired shape under pressure at a temperature at which the vitreous material softens and flows under pressure. For further details, see Japanese Patent Application No. 51151/80 filed by the same applicant. The organic, solventless resin is a resin that can be impregnated in vacuum under pressure at either ordinary temperature or elevated temperatures, and it is selected from among an epoxy resin, diallylphthalate or triisocyanurate resin, maleimide resin, triazine resin, and engineering plastics (e.g. polysulfone).

One embodiment of the insulating pipe joint having high heat resistance, high watertightness, as well as good mechanical and electrical properties according to the present invention is hereunder described by reference to FIG. 1 which is a side elevational section of that pipe joint, wherein a first tubular member generally indicated at (1) is inserted at one end in a second tubular member (2) which includes a cylinder (21) whose inside and outside diameters are equal to those of the first tubular member and an annular metal stopper (23) that is formed integral with the cylinder (21) through a shoulder (22) and whose inside diameter is larger than the outside diameter of the first tubular member. The first tubular member (1) nests in the annular metal stopper (23) of the seconnd tubular member (2) with a space (4) left between them. Both tubular members are made of a metal capable of withstanding a temperature of about 600° C., for example, iron or stainless steel. They are arranged concentrically with the space (4) left between them. A space (4) is filled with an insulator (7) made by casting a glass/mica composition (5) in the space, which is then impregnated with an organic, solventless resin (6) and cured. The insulator (7) holds the two tubular members (1) and (2) in position, provides perfect watertightness between them, and secures the creeping insulation distance between each tubular member.

The advantages of the insulating pipe joint of the present invention are now described in connection with the process for manufacturing it. The process comprises the following steps: a mixture of vitreous powder and mica powder from which the glass/mica composition is made is heated to a temperature of 650° C. or higher, and at the same time, the first and second tubular members (1) and (2) are heated to a temperature of 650° C. or higher; as the heating is continued, the mixture is pressed into the space (4) to form the desired glass/mica composition, and under the sustained pressure, the composition is cooled to the glass transistion point (until it solidifies completely); then, the mold is destroyed, thus completing the casting of the glass/mica composition.

If the working temperature of the joint right after the casting of the glas/mica composition is increased to 300° C., the first tubular member (1), glass/mica composition (5) and annular metal stopper (23) expand at their respective thermal expansion coefficients, with the result that the stopper has the largest inside and outside diameters, the glass/mica composition having the second largest dimensions, and the outside diameter of the first tubular member is the smallest. In consequence, a gap is formed between the glass/mica composition and the first tubular member or the stopper, and this causes a great drop in watertightness. To prevent this, according to the present invention, the gap is filled with a cycloaliphatic epoxy resin (an organic, solventless resin that has a viscosity of 64 cPs at 25° C. and which is a mixture of 95 parts by weight of Araldite DY-032 of Ciba-Geigy Corporation, 5 parts by weight of a phenoxy resin PKHH of Union Carbide Corporation and 3 parts by weight of 2-ethyl-4-methyl-imidazole of Shikoku Kasei Co., Ltd.) in vacuum under pressure by the following procedure: the insulating pipe joint filled with the casting of glass/mica composition is vacuum-dried at 120° C. and 1 mmHg for 8 hours, and immersed in a molten mass of the cycloaliphatic epoxy resin for one hour at 0.1 mmHg, and thereafter pressure is applied for 16 hours at 5 Kg/cm$^2$; thereafter, the joint is recovered from the resin bath, and cured first at 130° C. for 8 hours, then at 150° C. for an additional 8 hours. The so produced insulating pipe joint has good thermal, electrical and mechanical properties. Furthermore, it has very good watertightness properties since it withstands a water pressure test at 150 kg/cm$^2$ at both 25° C. and 300° C.

The same results are obtained if the cycloaliphatic epoxy resin is replaced by the following organic, solventless resins:

(1) Bisphenol A type epoxy resin (cured at 150° C. for 8 hours, then postcured at 175° C. for 4 hours).

Araldite GY-255 (Ciba-Geigy Corporation: 80 parts by weight
Cresyl glycidyl ether: 20 parts by weight
Methyl tetrahydrophthalic anhydride: 80 parts by weight
Zinc octenoate: 0.5 part by weight (2) Maleimide resin (cured at 150° C. for 4 hours, postcured at 200° C. for 1 hour, then at 220° C. for 2 hours).

Kelimide 601 (Rhone-Poulenc Industries): 100 parts by weight
Araldite CY-179 (Ciba-Geigy Corporation): 30 parts by weight
Methyl hexahydrophthalic anhydride: 18 parts by weight
Tin octenoate: 1 part by weight (3) Triazine resin (cured at 150° C. for 4 hours, then postcured at 220° C. for 4 hours)

Triazine A Resin KL3-400 (Bayer Aktiengesellschaft): 100 parts by weight
Diglycidyl ether of neopentyl glycol: 20 parts by weight
Zinc caprylate: 5 parts by weight As described in the foregoing, the insulating pipe joint of the present invention has good thermal, electrical and mechanical properties. In addition, it has very good water- and air-tightness properties.

What is claimed is:

1. An insulating pipe joint comprising a first tubular member, a second tubular member comprising a cylinder having the same inside diameter as that of the first tubular member and an annular metal stopper at one end of said cylinder whose inside diameter is larger than the outside diameter of the first tubular member, said annular metal stopper nesting the first tubular member with a space left between said annular metal stopper and the first tubular member, and an insulator made of glass/mica composition and a cured organic, solventless resin which is impregnated in vacuum under pressure and then cured, said insulator filling said space to hold the first and second tubular members in position and provide air- and water-tightness, and securing the insulation creeping distance between each tubular member and wherein said pipe joint is capable of withstanding a water pressure of 150 kg/cm$^2$ at both 25° C. and 300° C.

2. An insulating pipe joint according to claim 1 wherein said glass/mica composition is made of a vitreous powder and a mica powder.

3. An insulating pipe joint according to claim 1 or 2 wherein said cured organic, solventless resin is at least one cured product of an epoxy resin, diallyl phthalate or triisocyanurate resin, maleimide resin, triazine resin and polysulfone resin.

* * * * *